(No Model.) 3 Sheets—Sheet 1.

G. F. BLAKE.
COMPENSATING DEVICE FOR ENGINES.

No. 404,338. Patented May 28, 1889.

Witnesses.  
Edgar A. Goddard  
Frederick L. Emery.

Inventor.  
George F. Blake,  
by Crosby & Gregory  
Attys.

(No Model.)   3 Sheets—Sheet 2.

G. F. BLAKE.
COMPENSATING DEVICE FOR ENGINES.

No. 404,338.  Patented May 28, 1889.

Witnesses.
Howard F. Eaton.
Frederick L. Emery.

Inventor.
George F. Blake,
by Crosby & Gregory
Attys (No Model.) 3 Sheets—Sheet 3.

G. F. BLAKE.
COMPENSATING DEVICE FOR ENGINES.

No. 404,338. Patented May 28, 1889.

Witnesses.
Edgar A. Dobbin
Frederick L. Emery.

Inventor.
George F. Blake
by Crosby & Gregory
Attys

UNITED STATES PATENT OFFICE.

GEORGE F. BLAKE, OF BELMONT, ASSIGNOR TO THE GEORGE F. BLAKE MANUFACTURING COMPANY, OF BOSTON, MASSACHUSETTS.

COMPENSATING DEVICE FOR ENGINES.

SPECIFICATION forming part of Letters Patent No. 404,338, dated May 28, 1889.

Application filed August 31, 1888. Serial No. 284,267. (No model.)

*To all whom it may concern:*

Be it known that I, GEORGE F. BLAKE, of Belmont, county of Middlesex, State of Massachusetts, have invented an Improvement in Compensating Devices for Engines, of which the following description, in connection with the accompanying drawings, is a specification, like letters on the drawings representing like parts.

This invention relates to engines of that class in which the steam is used expansively, and it is especially applicable to single and duplex direct-acting pumping-engines.

Prior to my invention I am aware that pumping-engines have been provided with mechanism by which the power of the steam upon the piston is maintained substantially uniform throughout the length of the stroke of said piston, for instance, as shown and described in United States Patent No. 292,525, granted to C. C. Worthington January 29, 1884.

My invention has for its object to provide direct-acting engines, comprising a high and low pressure cylinder provided with independent or separate pistons and piston-rods, with simple and efficient mechanism connecting the said piston-rods, and arranged, as will be described, whereby the power of the engine, after the steam is cut off from the high and low pressure cylinders, is maintained substantially uniform.

My invention therefore consists, essentially, in a direct-acting engine, of a high-pressure cylinder and a low-pressure cylinder, pistons located in said cylinders and provided with independent piston-rods having rack-bars combined with a gear in mesh with said rack-bars and connecting said piston-rods, and with a compensating cylinder and its piston connected to said gear, to operate substantially as will be described.

Figure 1:
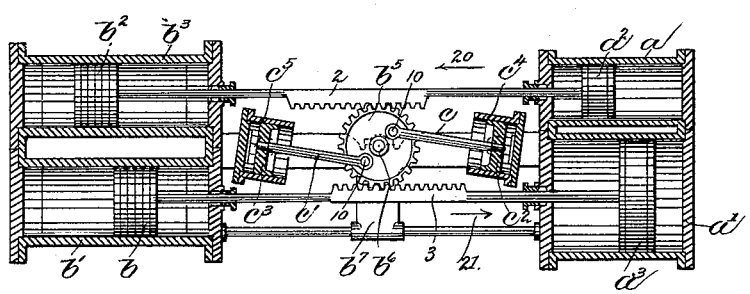
Figure 2:
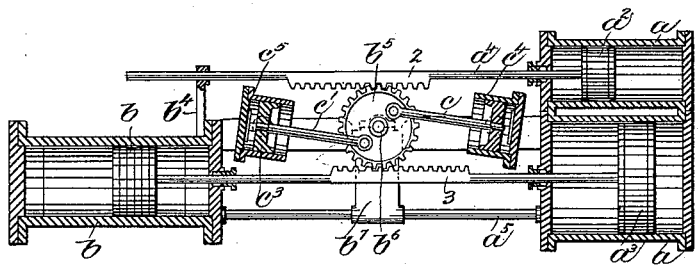
Figure 3:
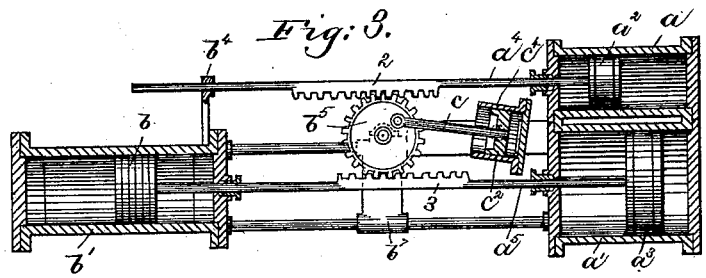
Figure 4:
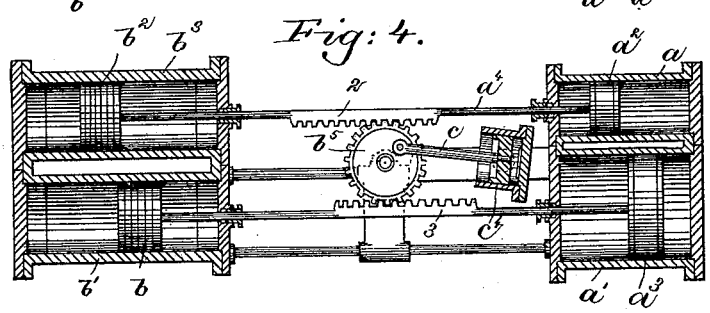
Figure 5:
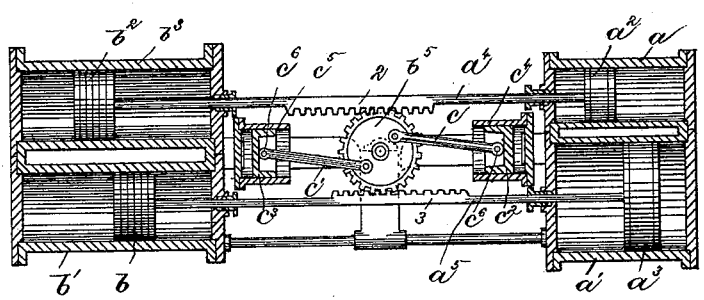
Figure 6:
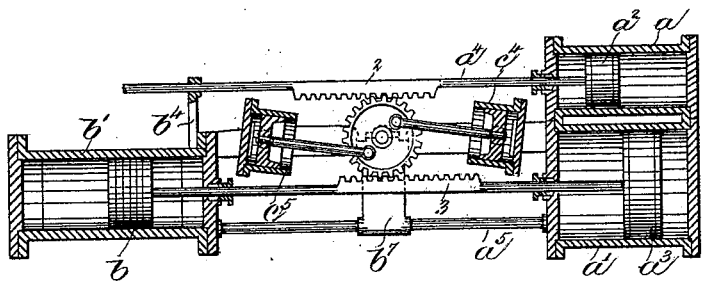

Figure 1 is a longitudinal section of a horizontal pumping-engine embodying my invention provided with two oscillating compensating cylinders. Fig. 2 is a longitudinal section of a horizontal or vertical pumping-engine provided with two steam-cylinders and one pump-cylinder and having two oscillating compensating cylinders; Fig. 3, a longitudinal section of the engine shown in Fig. 2, with only one oscillating compensating cylinder; Fig. 4, a longitudinal section of the engine shown in Fig. 1, with only one oscillating compensating cylinder; Fig. 5, a longitudinal section of the engine shown in Fig. 1, with the compensating cylinders made stationary; Fig. 6, a longitudinal section of the engine shown in Fig. 7; and Fig. 7, a top or plan view of a duplex pumping-engine with the valve mechanism omitted, the said engine being substantially such as shown in Fig. 6, with two oscillating compensating cylinders for each engine.

Figure 7:
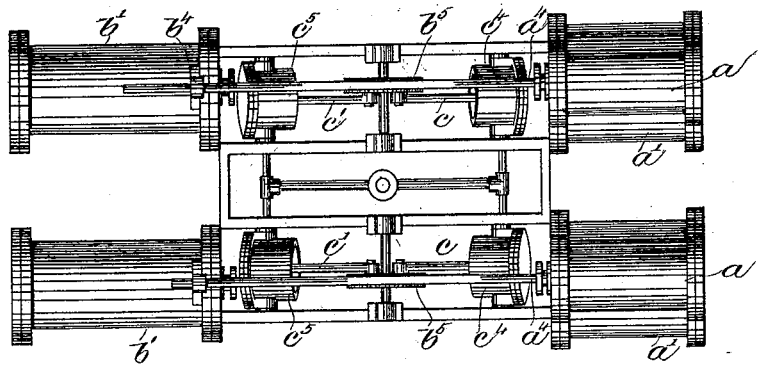

The pumping-engine, which is herein shown provided with my improved compensating mechanism, is of the well-known type of direct-acting pumping-engines, it being shown in Figs. 1 to 6, inclusive, as a single engine, and in Fig. 7 as a duplex engine. Each single engine is composed of a high-pressure steam-cylinder, $a$, and low-pressure cylinder $a'$, provided, respectively, with pistons $a^2$ $a^3$, having piston-rods $a^4$ $a^5$, the high-pressure cylinder being located, as herein shown, out of line with the low-pressure cylinder. The piston-rod $a^5$ of each low-pressure engine is connected to a piston, $b$, of a pump-cylinder, $b'$, and each piston-rod $a^4$, as shown in Figs. 1, 3, and 4, is connected to a piston, $b^2$, of a pump-cylinder, $b^3$; but, as shown in Figs. 2, 3, and 5, the piston-rod $a^4$ is supported in a suitable guide or upright, $b^4$. The piston-rods $a^4 a^5$ have secured to or forming part of them for a portion of their length rack-bars 2 3, respectively, the said rack-bars being in engagement with the teeth of a gear-wheel, $b^5$, mounted on a shaft or arbor, $b^6$, having journal-bearings in uprights $b^7$ secured to the engine-frame. The gear $b^5$ has pivotally secured to it on opposite sides of the shaft or arbor $b^6$ piston-rods $c$ $c'$ of pistons $c^2 c^3$ in the compensating cylinders $c^4$ $c^5$, the said compensating cylinders, as shown in Figs. 1, 2, 3, 4, 6, and 7, being supported on suitable journals, whereby the said cylinders may oscillate to conform to the oscillation of the gears $b^5$, the piston-rods, as shown in the said figures, being firmly secured to their pistons.

If desired, the compensating cylinders may be made stationary, as shown in Fig. 5, the piston-rods of each auxiliary piston being pivotally connected to its piston, as at $c^6$.

The valves and valve-operating mechanism are not herein shown, as they form no part of my present invention, and are so well known as to need no specific description, they being such, for instance, as used on the well-known direct-acting pumping-engine.

In operation, let it be supposed that the piston $a^2$ of the high-pressure cylinder is traveling in the direction indicated by arrow 20, Fig. 1, and the piston $a^3$ of the low-pressure cylinder in the direction indicated by arrow 21, and that the admission of steam to the cylinders has been cut off. While steam is being admitted to the cylinders $a\ a'$ the movement of the pistons in said cylinders is opposed by the steam acting on the pistons in the compensating cylinders; but when the steam has been cut off from the cylinders $a\ a'$ the further movement of the pistons $a^2\ a^3$ in the directions indicated by arrows 20 and 21 is assisted by the action of the steam, air, water, or other agent in the compensating cylinders until the said pistons have completed their strokes in the said directions, the cranks or pivotal points 10 of the connecting-rods $c\ c'$ being at such time vertically in line with the shaft $b^6$. On the return-stroke of the pistons $a^2\ a^3$ the compensating pistons $c^2\ c^3$ oppose the motion of the pistons while steam is being admitted to the cylinders; but when the steam is cut off from the high and low pressure cylinders $a$ and $a'$, respectively, the loss of power of these cylinders, due to the reduction of pressure by expansion, is made up by the power derived from the compensating cylinder, whose power increases at about the same rate that the power of the high and low pressure cylinders decrease, owing to the increase of leverage with which the compensating cylinders acts on the gear-wheel $b^5$, thus making the total motive power of the engine practically uniform throughout the stroke.

I claim—

In a direct-acting engine, a high-pressure cylinder and a low-pressure cylinder, pistons located in said cylinders and provided with independent piston-rods having rack-bars 2 3, combined with a gear, $b^5$, in mesh with said rack-bars and connecting said piston-rods, and with a compensating cylinder and its piston connected to said gear, to operate substantially as described.

In testimony whereof I have signed my name to this specification in the presence of two subscribing witnesses.

GEO. F. BLAKE.

Witnesses:
GEO. M. WARREN,
WM. H. SARGENT.